United States Patent [19]

Bürmann

[11] Patent Number: 5,711,140
[45] Date of Patent: Jan. 27, 1998

[54] SELF-PROPELLING HARVESTER THRESHER WITH COMPOSITE CUTTING TABLE

[75] Inventor: Dominik Bürmann, Verl, Germany

[73] Assignee: Claas Kommanditgesellschaft Auf Aktien, Harsewinkel, Germany

[21] Appl. No.: 596,733

[22] Filed: Feb. 5, 1996

[30] Foreign Application Priority Data

Feb. 9, 1995 [DE] Germany .................. 195 04 244.1

[51] Int. Cl.$^6$ .................................................. A01D 69/00
[52] U.S. Cl. .................................................. 56/208; 56/14.4
[58] Field of Search .................................. 56/14.4, 14.6, 56/16.4, 208, 209, DIG. 1, 364, 10.4, 11.6; 172/311, 459, 668

[56] References Cited

U.S. PATENT DOCUMENTS

| | | | |
|---|---|---|---|
| 3,982,383 | 9/1976 | Mott | 56/208 X |
| 4,011,709 | 3/1977 | Mott et al. | 56/208 X |
| 4,174,603 | 11/1979 | Parrish | 56/208 |
| 4,441,307 | 4/1984 | Enzmann | 56/208 |
| 4,665,685 | 5/1987 | Rupprecht | 56/208 |
| 4,956,966 | 9/1990 | Patterson | 56/208 X |
| 5,455,769 | 10/1995 | Panowshek et al. | 56/208 X |

FOREIGN PATENT DOCUMENTS

244665  1/1996  Germany .................. A01D 11/10

Primary Examiner—Terry Lee Melius
Assistant Examiner—Robert Pezzuto
Attorney, Agent, or Firm—Michael J. Striker

[57] ABSTRACT

A cutting table of a self-propelling harvester thresher is composed of two cutting table parts which are steplessly adjustable relative to one another so as to overlap each other in any possible position. In order to use the cutting table for harvesting of rape, both cutting table parts after releasing of a lock are extensible so that a distance is provided between the cutting table parts. The distance is overlapped by an additional bottom plate and two additional side wall parts, so as to produce a cutting table with such a distance from a cutter bar to a drawing roller which allows cutting and drawing in of rape.

11 Claims, 7 Drawing Sheets

SELF-PROPELLING HARVESTER THRESHER WITH COMPOSITE CUTTING TABLE

BACKGROUND OF THE INVENTION

The present invention relates to a self-propelling harvester thresher with a composite cutting table.

More particularly, it relates to a self-propelling harvester thresher with a cutting table separated into two parts with one part composed of substantially two side walls, a bottom plate and a rear wall provided with a throughgoing opening, and with a second part which is trough-shaped and composed of two side walls and a bottom plate. In such cutting table the second part is steplessly adjustable relative to the first part by hydraulic cylinder-piston units arranged parallel and at a distance from one another under the bottom plates, for changing the distance between the drawing-in roller and the cutter bar.

The adjustability of this known cutting table is advantageous for cutting of differently high blades and in particular for covering of laid grain, since it allows adaptation of the mowing device to the corresponding blade lengths and prevents engagement of ears (spikes) by the drawing roller before cutting of the associates blades. The adjustment region is limited by the length of both parts of the cutting table. The reason is that on the one hand they still overlap during the maximum adjustment path, and on the other hand they must be displaced into one another so far that very short blade products must be cut and drawn-in unobjectionably. In view of this unavoidable requirement it has not been possible to design a cutting table separated into two parts so that it can also harvest over long blade products, for example rape. For harvesting of rape separate cutting tables or supply devices are utilized, and since they are used for the single purpose in particular the harvesting of rape they are expensive and inefficient.

SUMMARY OF THE INVENTION

Accordingly, it is an object of the present invention to provide a self-propelling harvester thresher with a composite cutting table subdivided into two parts, which avoids the disadvantages of the prior art, and can be used for harvesting of rape.

In keeping with these objects and with others which will become apparent hereinafter, one feature of the present invention resides, briefly stated, in a self-propelling harvester thresher of the above mentioned general type in which the maximum adjustment path of both parts of the cutting table, where the both bottom plates as well as the associated side walls overlap one another, is limited at least by a mechanical locking element which is bringable in an operative position, and the maximum stroke of the cylinder-piston unit is greater than the adjustment path of both parts of the cutting table limited by the locking element, and when the locking element is not operative and the piston rods of the cylinder-piston units are completely extended a distance is provided between the stationary part of the movable part of the cutting table such that this distance is overlapped by an intermediate bottom and two built-in side wall parts.

When the harvester thresher is designed in accordance with the present invention, it eliminates the disadvantages of the prior art.

In accordance with an advantageous feature of the present invention, several parallel profiled members are fixedly connected with the bottom plate under the bottom plate of the stationary first part of the cutting table. The cylinders of the cylinder-piston units are fixedly supported in the bottom plate, while the piston rods of the cylinder-piston units are mounted on the profiles which hold the profiled members which receive the cylinders and telescopically displaceably cooperate with the same. The moveable profiles support the front part of the cutting table composed of the side walls and the bottom plate, as well as the cutting bar.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
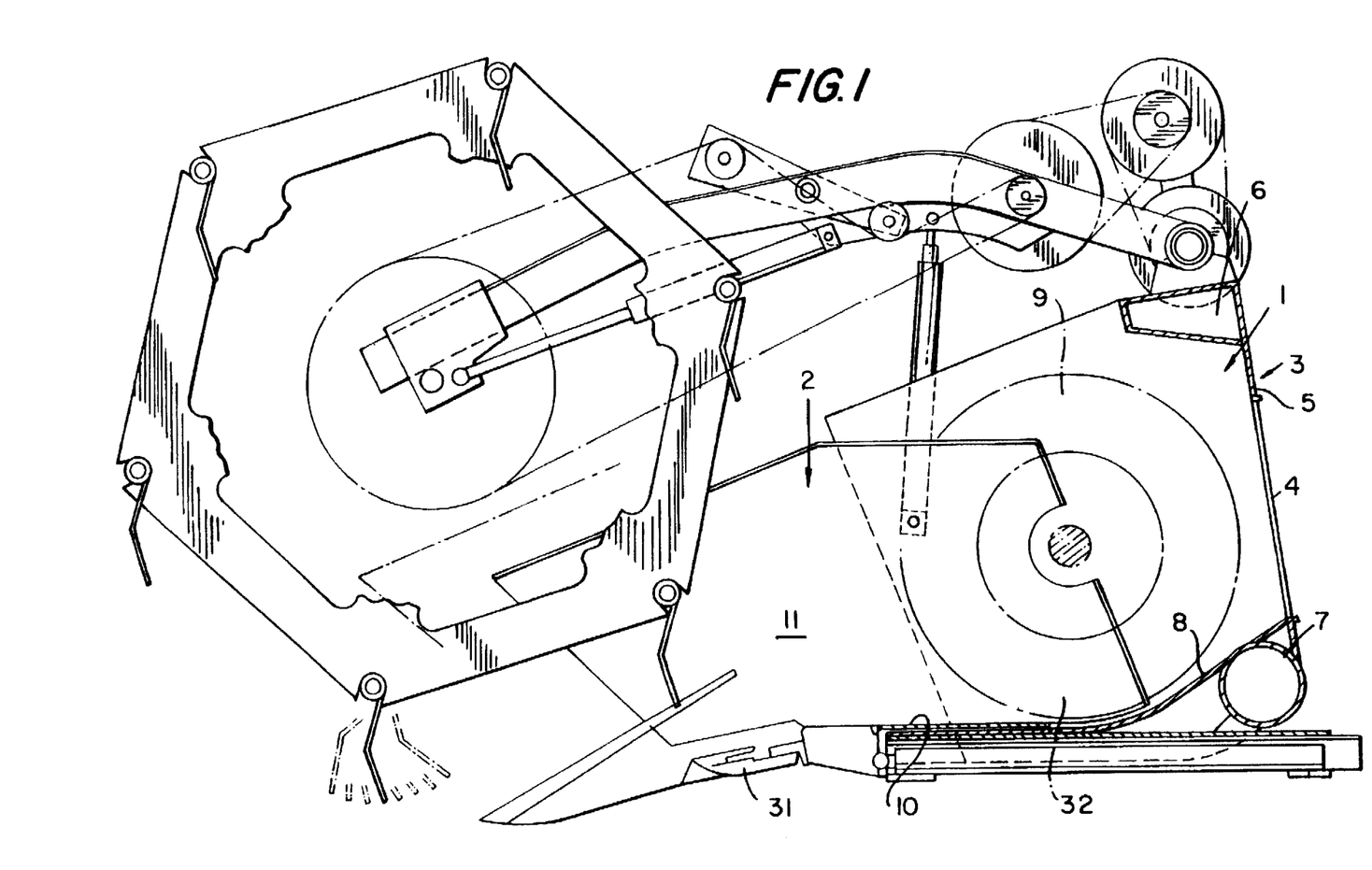
FIG. 1 is a view showing a front part of a self-propelling harvester thresher with a cutting table composed of two parts in a proximal position in accordance with the present invention.

FIG. 1 shows a cutting table of a self-propelling harvester thresher in accordance with the present invention. The cutting table has a stationary cutting table part 1 and a movable cutting table part 2. The stationary cutting table part 1 has a rear frame 3. The rear frame 3 includes a rear wall 5 provided with a throughgoing opening 4, and upper reinforcing profile 6, a lower supporting tube 7, a bottom plate 8, and side walls 9. The moveable cutting table part 2 includes substantially a bottom plate 10 and side walls 11. As can be seen from FIG. 1, both cutting table parts 1 and 2 are displaceable in one another telescopically so that they can form together a very short cutting table.

Figure 2:
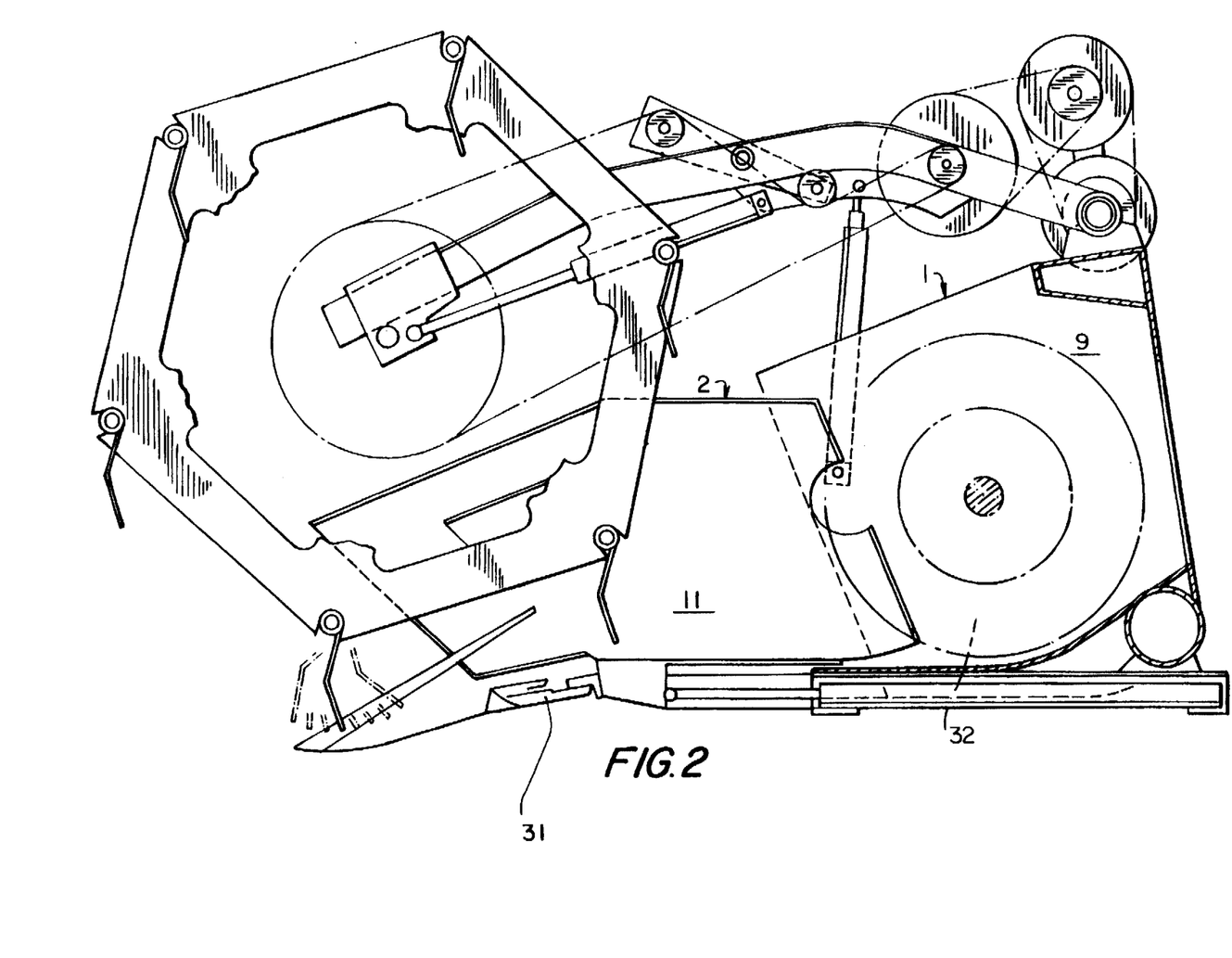
FIG. 2 is a view showing the cutting table of FIG. 1 in a partially extended position in accordance with the present invention.

FIG. 2 shows the position in which the moveable cutting table part is extended so far that an overlapping connection is provided to the stationary cutting table part 1.

Figure 4:
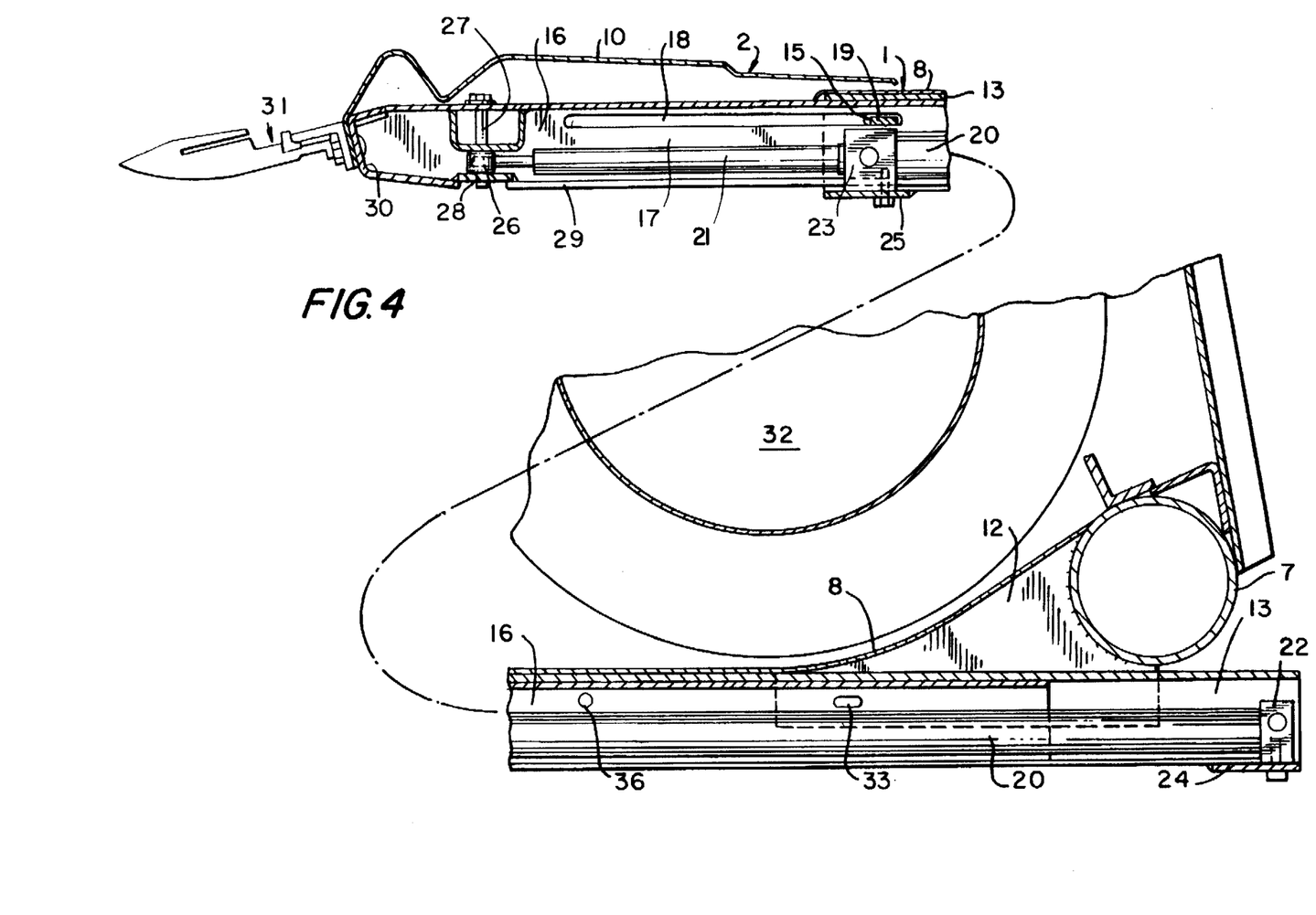
FIG. 4 is a view showing a support and position of a displacing element in correspondence with the position of the cutting table of FIG. 2.

As shown in FIG. 4 blades 12 are welded with the supporting tube 7 and the bottom plate and extend freely downwardly. One downwardly open U-profile 13 is fixedly connected with tool blade 12. The outwardly freely extending web of each U-profile is bent inwardly at a small amount about 90° and, these webs form supporting surfaces. Both lateral legs of each U-profile have a passage 15 in their front region. A U-profile 16 is inserted in each U-profile 13 and in its leg 17 longitudinal slots 18 are provided.

In the position shown in FIG. 4, the inner U-profile 16 is not extended farther out of the outer U-profile 13, since namely the position of the U-profile 16 relative to the farther extending movement is secured by a locking member 19 which extends through a throughgoing opening 15 in the outer U-profile as well the longitudinal slot 18 in the inner U-profile 16.

It is however possible to insert the inner profile 16 farther into the outer profile 13 in correspondence with the length of the longitudinal slot 18. This is performed by cylinder-piston units 39–42 each having a cylinder 20 and a piston rod 21. Each cylinder 20 is connected with plates 24 and 25 through consoles 22 and 23. The plates 24 and 25 are welded with their inwardly extending leg parts of the legs 14, in both end regions of the U-profile 13. The piston rod 21 of each cylinder-piston unit has a front mounting head 26, through which a pin 27 passes. The pin 27 is connected with the associated inner U-profile 16 and with a bridge plate 28 which is welded with the inwardly extending legs 29 of the U-profile 16. The front part of the U-profile 16 has an end wall 30. A cutter bar 31 as well as the bottom plate 20 are screwed with the end wall 30.

Figure 5:
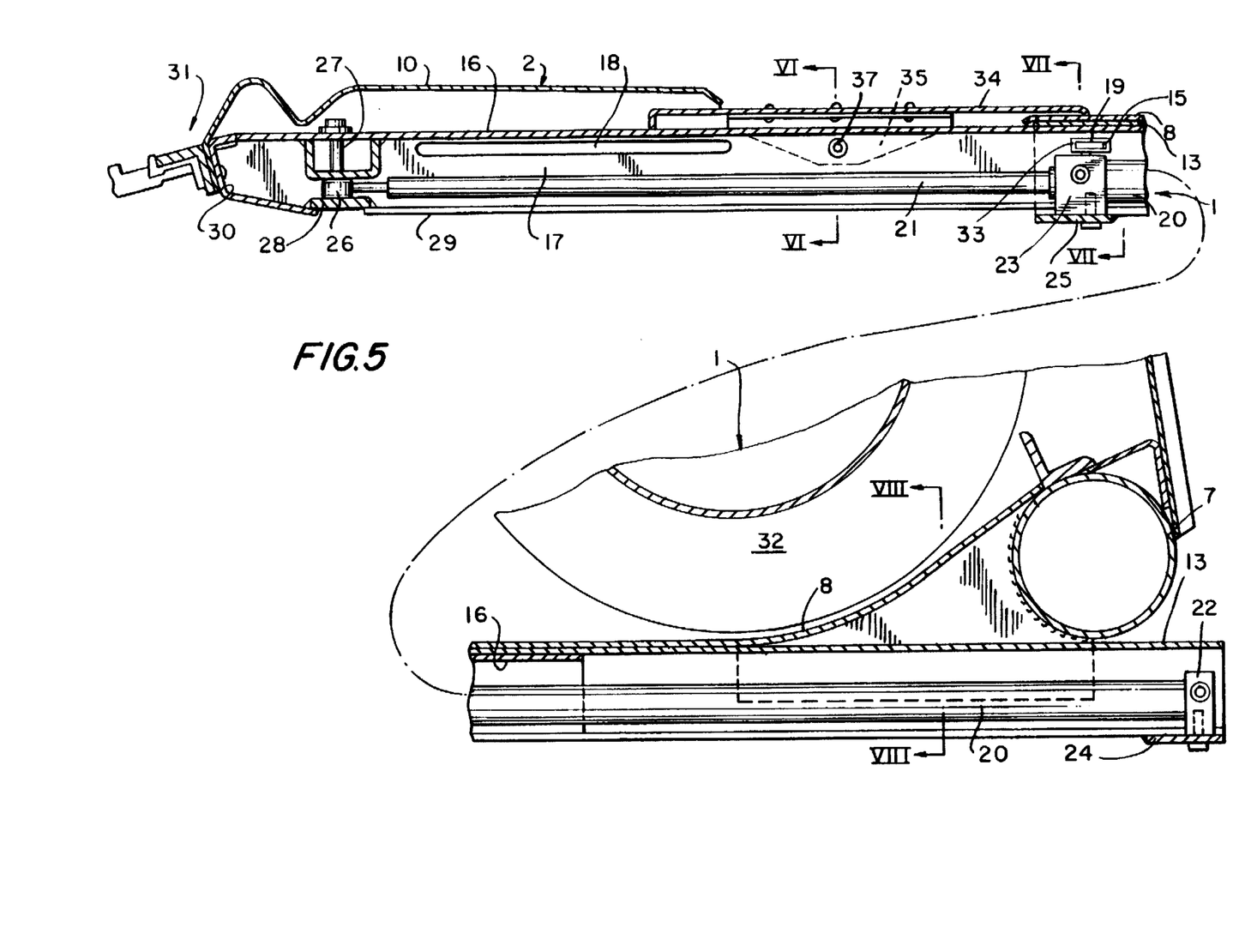
FIG. 5 is a view showing a lower displaceable part of the cutting table of FIG. 2, on an enlarged scale.
Figure 6:
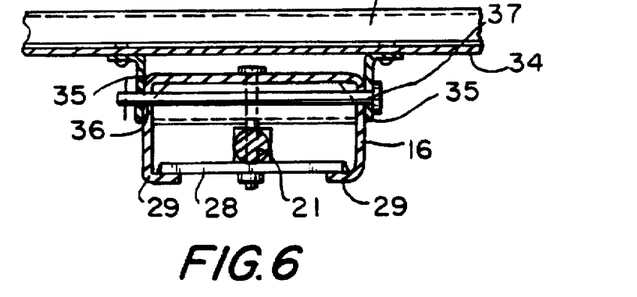
FIG. 6 is a view showing a section of the displaceable part of the cutting table taken along the line VI—VI in FIG. 5.
Figure 7:
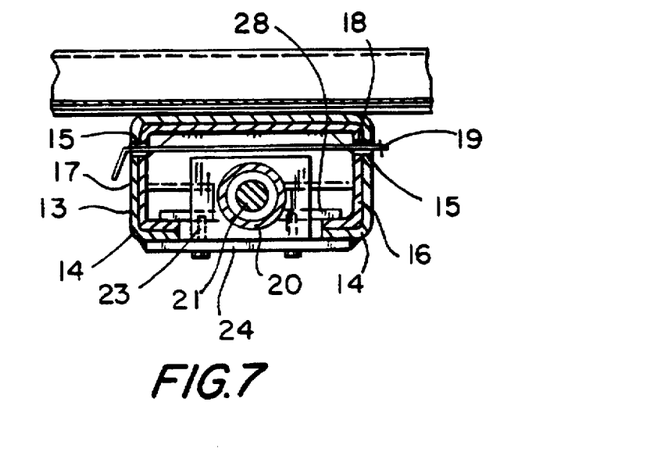
FIG. 7 is a view showing a section of the displaceable part of the cutting table taken along the line VII—VII in FIG. 5.
Figure 8:
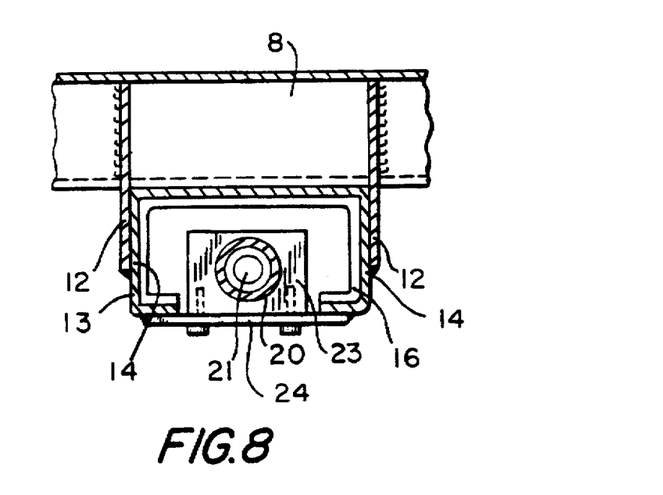
FIG. 8 is a view showing a section of the displaceable part of the cutting table taken along the line VIII—VIII in FIG. 5.

As can be seen from FIG. 4, the bottom plate 20 overlaps the bottom plate 8 in the shown position only over to a small extent. In this position of the both cutting table parts 1 and 2 relative to one another, relatively long-stalk agricultural products can be processed. For harvesting of rape however the position shown in FIG. 2 is insufficient. In other words, the distance of the cutter bar 31 from the drawing roller 32 is too small. For increasing this distance, the locking member 19, as shown in FIG. 4 is first removed. All cylinders 20 are supplied with pressurized oil, and the piston rods 21 are extended until the throughgoing openings 33 in the lateral legs of the inner U-profile 16 (FIG. 4) are both in alignment with the throughgoing passages 15 in the legs of the outer U-profile 13. When the locking member 19 is again inserted and the position of the profiles 13 and 16 relative to one another is fixed. During this displacing movement the cutting table parts 1 and 2 are moved so far from one another that a gap is provided between them. For filing this gap, an intermediate bottom 34 shown in FIGS. 5 and 6 is provided.

Figure 3:
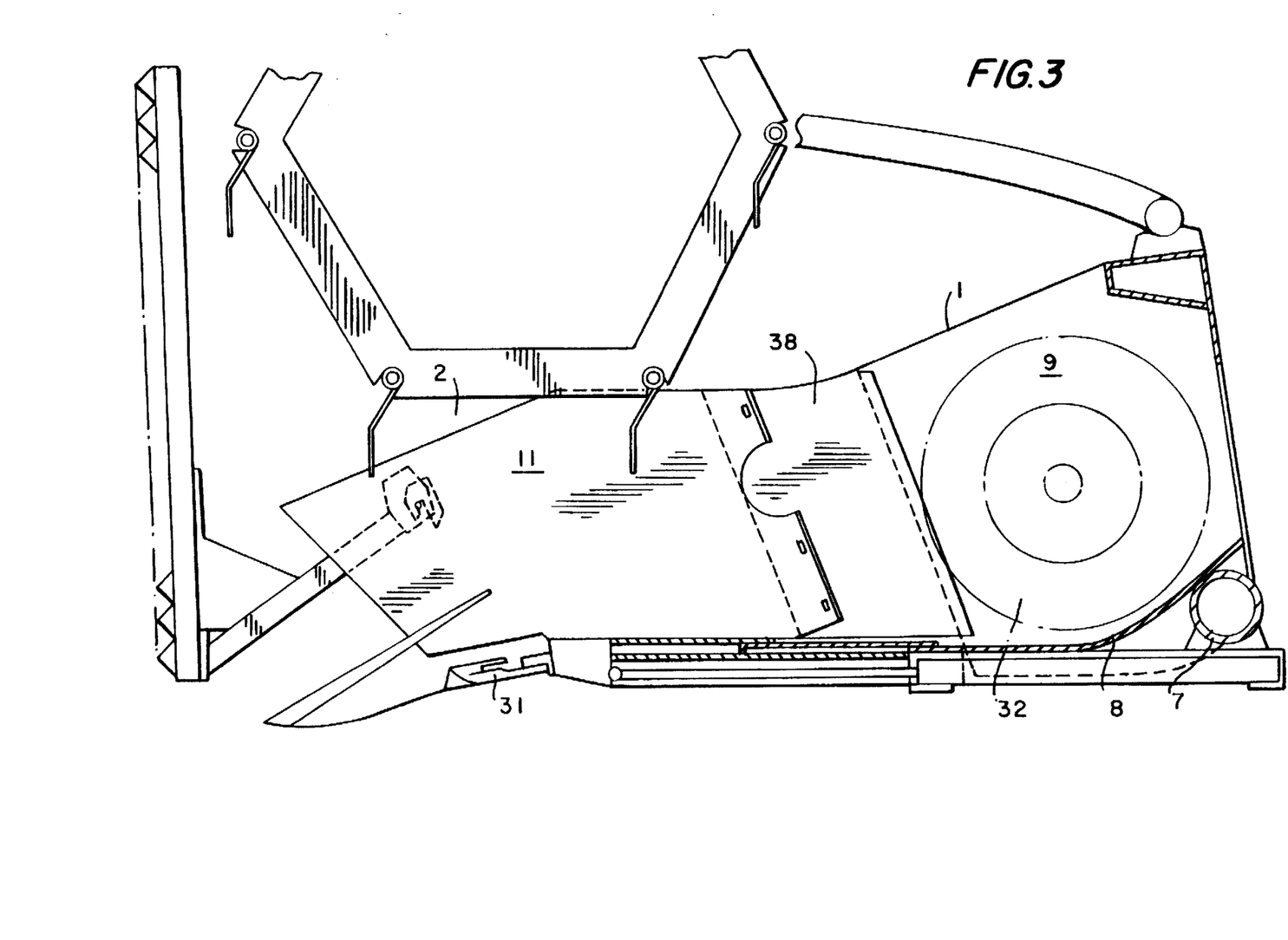
FIG. 3 is a view showing the cutting table of FIG. 1 in a completely extended position in accordance with the present invention.

The intermediate bottom on the one hand overlaps the bottom plate 8 of the stationary cutting table part 1, and on the other hand the bottom plate 10 of the moveable cutting table 2 is overlapped. For fixing of the part 34, downwardly extending angle members 35 are riveted with this part. Corresponding two angular members 35 laterally engage the U-profile 16. Throughgoing openings 36 are provided in the lateral legs of the U-profile 16. They are aligned with the openings in the supporting angle members 35. Then the intermediate bottom 34 can be locked with U-profile 16 by the pin 37, and thereby a continuous bottom is formed from the parts 10, 34 and 8. FIG. 3 specifically shows that the distance between the side walls 9 and 11 is bridged by the intermediate wall 38.

Figure 9:
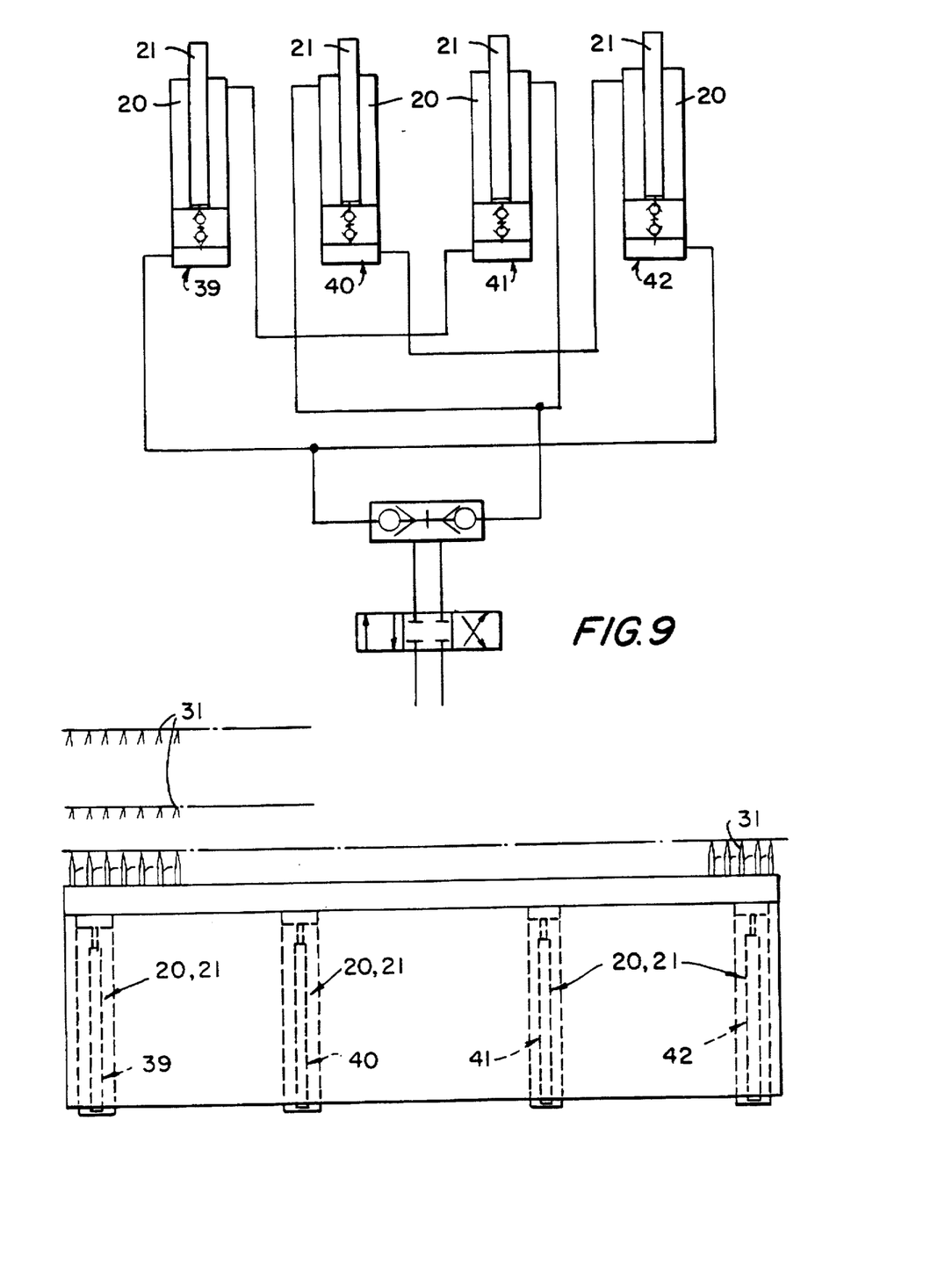
FIG. 9 is a view showing a position of hydraulic cylinder-piston units relative to the cutting table as well as a circuit for synchronization of all cylinders.

FIG. 9 schematically shows the position of the cylinder-piston units 39–42 relative to the cutting mechanism 1, 2 as well as a circuit for synchronization of the piston rods 21. It can be seen that the cylinder-piston units are subdivided into two synchronized cylinder groups. The first group includes the cylinder-piston unit 39 and 41 while the second group includes the cylinder-piston units 40 and 42. Thereby only two cylinder-piston units of different size can be employed regardless of the number of the used cylinder-piston units. It has been conventional to assemble the cylinder-piston units to a single group. This means that all pistons must be stocked after their diameter relative to one another in a cascade-like fashion, so that all cylinder-piston units had different sizes.

It will be understood that each of the elements described above, or two or more together, may also find a useful application in other types of constructions differing from the types described above.

While the invention has been illustrated and described as embodied in a self-propelling harvester thresher with composite cutting table, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A self-propelling harvester thresher, comprising a cutting table, said cutting table including a cutter bar, a drawing roller, a first cutting table part having two side walls, a first bottom plate and a rear wall provided with a throughgoing opening, and a second trough-shaped cutting table part including two walls and a second bottom plate; a plurality of cylinder-piston units arranged under said bottom plates parallel and spaced from one another and moving said second cutting table part relative to said first cutting table part steplessly for shortening or lengthening a distance of said cutter bar relative to said drawing roller; a releasable locking element limiting a displacement path within a maximum displacement of said cutting table parts relative to one another in which said bottom plates and said side walls overlap one another so that a maximum stroke of said cylinder-piston units is greater than said displacement path of said cutting plate parts limited by aid locking element, said cylinder-piston units bieng arranged so that when said locking element is in a released position and piston rods of said cylinder-piston units are completely extended, a space is provided between said cutting table parts; and means for overlapping said space, said means including an intermediate bottom and two intermediate side walls.

2. A self-propelling harvester thresher as defined in claim 1, wherein said first cutting table part is stationary; and further comprising a plurality of parallel profiles space from one another under said bottom plate of said first cutting table part and connected with said bottom plate of said first cutting table part, said cylinder-piston units having cylinders fixedly supported in said bottom plate of said first cutting table part; and a plurality of further profiles which are held by said first mentioned profiles which support said cylinders and are telescopically displaceable relative to said first mentioned profiles, said piston rods of said cylinder-piston units being mounted on said further displaceable profiles, said second cutting table part being moveable and supported by said further displaceable profiles, said second moveable cutting table part including said side walls, said bottom plate and said cutter bar.

3. A self-propelling harvester thresher as defined in claim 2, wherein said intermediate bar is connected with at least one of said further displaceable profiles.

4. A self-propelling harvester thresher as defined in claim 3, wherein said at least one displaceable profile has side limiting members, said intermediate bottom having two downwardly extending supporting angular members connected with said side limiting members of said at least one displaceable profile.

5. A self-propelling harvester thresher as defined in claim 2, wherein each of said first mentioned profiles is a downwardly open U-profile having two freely extending legs which are angled inwardly at 90°, each of said further displaceable profiles being telescopically moveable in said downwardly open U-profile, each of said first mentioned profiles being also formed as a downwardly open U-profile with inwardly angled legs.

6. A self-propelling harvester thresher as defined in claim 2, wherein each of said first mentioned profiles has freely extending legs having end regions; and further comprising a plate connecting said end regions of said legs of each of said first mentioned profiles, said cylinder of each of said cylinder-piston units being supported on said plate.

7. A self-propelling harvester thresher as defined in claim 2, wherein said further displaceable profiles have front end walls which are closed by end walls, said end walls being connected with end walls of said cutter bar and with said bottom plate of said second cutting table part.

8. A self-propelling harvester thresher as defined in claim 1, wherein said cylinder-piston units are formed as synchronized cylinders.

9. A self-propelling harvester thresher as defined in claim 2, wherein said first mentioned profiles include an outer U-profile while said further displaceable profiles include an inner U-profile, said locking element being mounted in said outer U-profile and engages through a longitudinal slot provided in both lateral legs of said inner U-profile so that by a length of said longitudinal slot a stepless displacement of said second cutting table part relative to said first cutting table part is provided, and within said displacement region said bottom plates and said side walls of said cutting table parts overlap one another.

10. A self-propelling harvester thresher as defined in claim 9, wherein said inner U-profile and said outer U-profile are mechanically locked with one another in a position in which they extend from one another to a maximum extent.

11. A self-propelling harvester thresher as defined in claim 1, wherein said cylinder-piston units include a plurality of pairs of said cylinder-piston units, said cylinder-piston units of said pair being formed as a synchronous cylinder.

* * * * *